United States Patent
Yamashita et al.

(10) Patent No.: US 9,505,436 B2
(45) Date of Patent: Nov. 29, 2016

(54) PARKING ASSIST SYSTEM

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Tomohisa Yamashita, Toyohashi (JP); Masaya Kato, Toyokawa (JP); Hiroyuki Tachibana, Okazaki (JP); Takashi Kuwayama, Nagoya (JP); Hironobu Ishijima, Toyota (JP); Keisuke Oyama, Toyota (JP)

(73) Assignees: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/849,776

(22) Filed: Sep. 10, 2015

(65) Prior Publication Data
US 2016/0075375 A1   Mar. 17, 2016

(30) Foreign Application Priority Data

Sep. 12, 2014 (JP) ................. 2014-186797

(51) Int. Cl.
*B62D 15/02* (2006.01)
*B60K 35/00* (2006.01)

(52) U.S. Cl.
CPC ........... *B62D 15/0285* (2013.01); *B60K 35/00* (2013.01); *B62D 15/028* (2013.01)

(58) Field of Classification Search
CPC ..................... B62D 15/0285; B60K 35/00
USPC ............................................... 701/41
See application file for complete search history.

(56) References Cited

U.S. PATENT DOCUMENTS

| 6,154,695 A | 11/2000 | Shimizu et al. |
| 7,103,461 B2 | 9/2006 | Iwazaki et al. |
| 2005/0027415 A1* | 2/2005 | Iwazaki ............... B62D 15/029 701/36 |

(Continued)

FOREIGN PATENT DOCUMENTS

| JP | 11-78940 A | 3/1999 |
| JP | 11-192958 A | 7/1999 |

(Continued)

OTHER PUBLICATIONS

Communication dated Jul. 26, 2016 from the Japanese Patent Office in counterpart Application No. 2014-186797.

*Primary Examiner* — Anne M Antonucci
(74) *Attorney, Agent, or Firm* — Sughrue Mion, PLLC

(57) ABSTRACT

A parking assist system includes an electronic control unit. The electronic control unit is configured to detect an available parking area in an area around a vehicle, calculate a parking guidance path for guiding the vehicle from a current position of the vehicle to a parking target position included in the available parking area, execute guidance control for guiding the vehicle to the parking target position by executing at least steering control along the parking guidance path, and, when an end condition for ending guidance is satisfied in the middle of execution of the guidance control, end the guidance control and carry out at least one of steering to keep a steering angle at an end of the steering control for a predetermined period or steering to gradually reduce the steering angle from the steering angle at the end of the steering control toward a neutral position.

11 Claims, 14 Drawing Sheets

(56) References Cited

U.S. PATENT DOCUMENTS

2007/0288145 A1 12/2007 Maeda et al.
2009/0076673 A1* 3/2009 Brabec ................ A01B 69/008
　　　　　　　　　　　　　　　　　　　　701/23

FOREIGN PATENT DOCUMENTS

| JP | 2005-014776 A | 1/2005 |
| JP | 2007-331479 A | 12/2007 |

* cited by examiner

PARKING ASSIST SYSTEM

INCORPORATION BY REFERENCE

The disclosure of Japanese Patent Application No. 2014-186797 filed on Sep. 12, 2014 including the specification, drawings and abstract is incorporated herein by reference in its entirety.

BACKGROUND OF THE INVENTION

1. Field of the Invention

The invention relates to a parking assist system.

2. Description of Related Art

Generally, there is suggested a parking assist system that searches for a parking space in which a host vehicle is allowed to be parked with the use of various sensors mounted on the vehicle, that calculates an optimal vehicle trajectory to a parking target position set in the parking space and that guides the host vehicle to the parking space in accordance with the vehicle trajectory by automatically executing steering control. Among such parking assist systems, there is a parking assist system that, when a vehicle speed during guidance exceeds a predetermined value, cancels parking assist, such as steering control, and leaves an operation to a driver (for example, Japanese Patent Application Publication No. 2005-14776 (JP 2005-14776 A)).

SUMMARY OF THE INVENTION

However, when parking assist is cancelled, assist torque for steering becomes zero, so a steering angle attempts to return to a neutral position. For example, when parking assist is cancelled at the time when a vehicle is turning in order to enter a parking space, a user may experience a feeling of strangeness because of an abrupt change in a turning state or behavior of the vehicle. In addition, it is required to quickly react a return from that state, so the user may experience inconvenience.

A first aspect of the invention provides a parking assist system. The parking assist system includes an electronic control unit. The electronic control unit is configured to detect an available parking area in an area around a vehicle, calculate a parking guidance path for guiding the vehicle from a current position of the vehicle to a parking target position included in the available parking area, execute guidance control for guiding the vehicle to the parking target position by executing at least steering control along the parking guidance path, and, when an end condition for ending guidance is satisfied in the middle of execution of the guidance control, end the guidance control and carry out at least one of steering to keep a steering angle at an end of the steering control for a predetermined period or steering to gradually reduce the steering angle from the steering angle at the end of the steering control toward a neutral position.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may obtain at least one of various advantageous effects based on a basic configuration or secondary advantageous effects.

A vehicle 1 on which a parking assist system according to the present embodiment is mounted may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
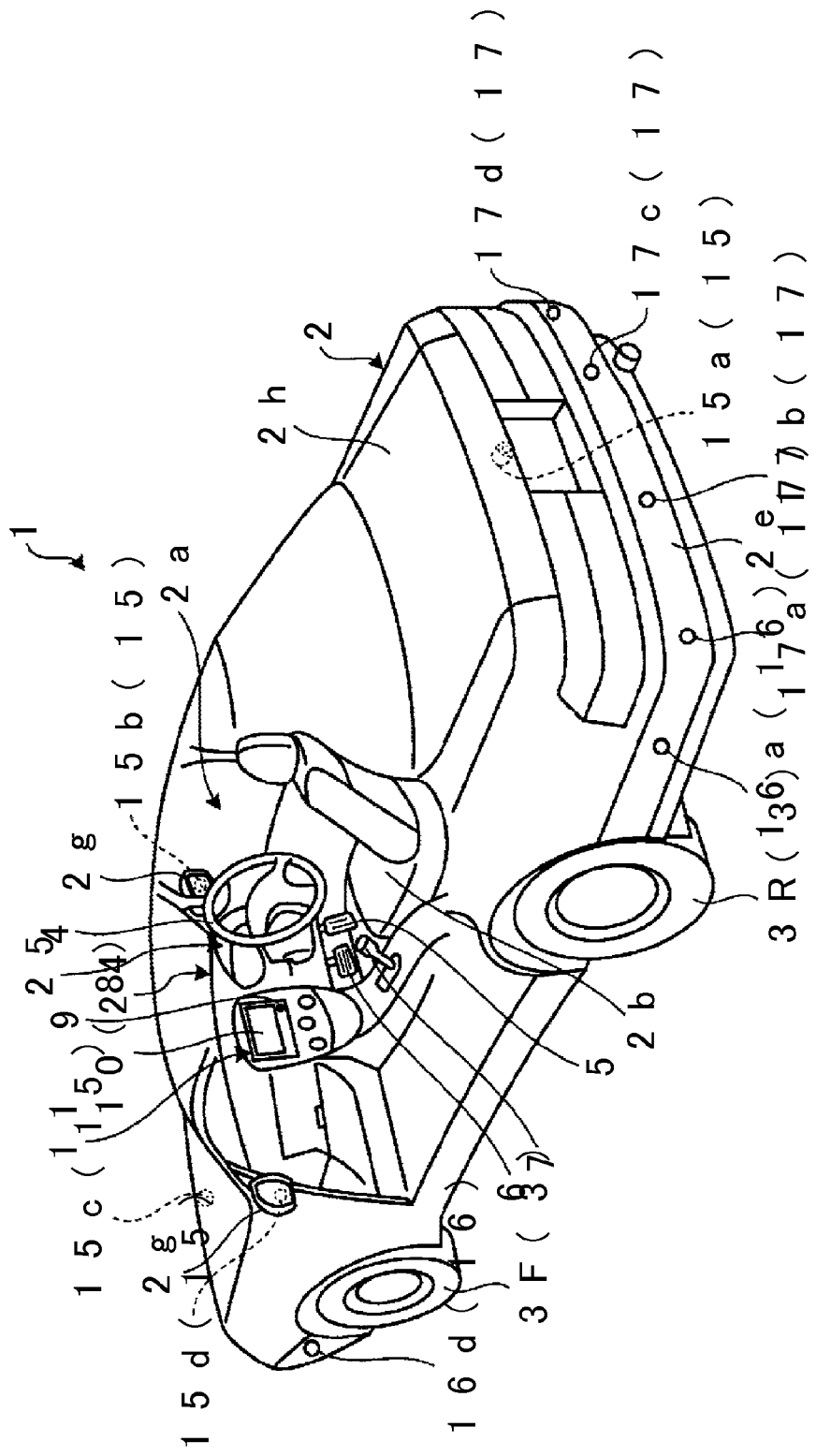

As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an operation input by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2a, different from the monitor device 11. Audio may be output from the audio output device 9 of the monitor device 11 and another audio output device. The monitor device 11 is, for example, shared with a navigation system or an audio system.

Figure 3:
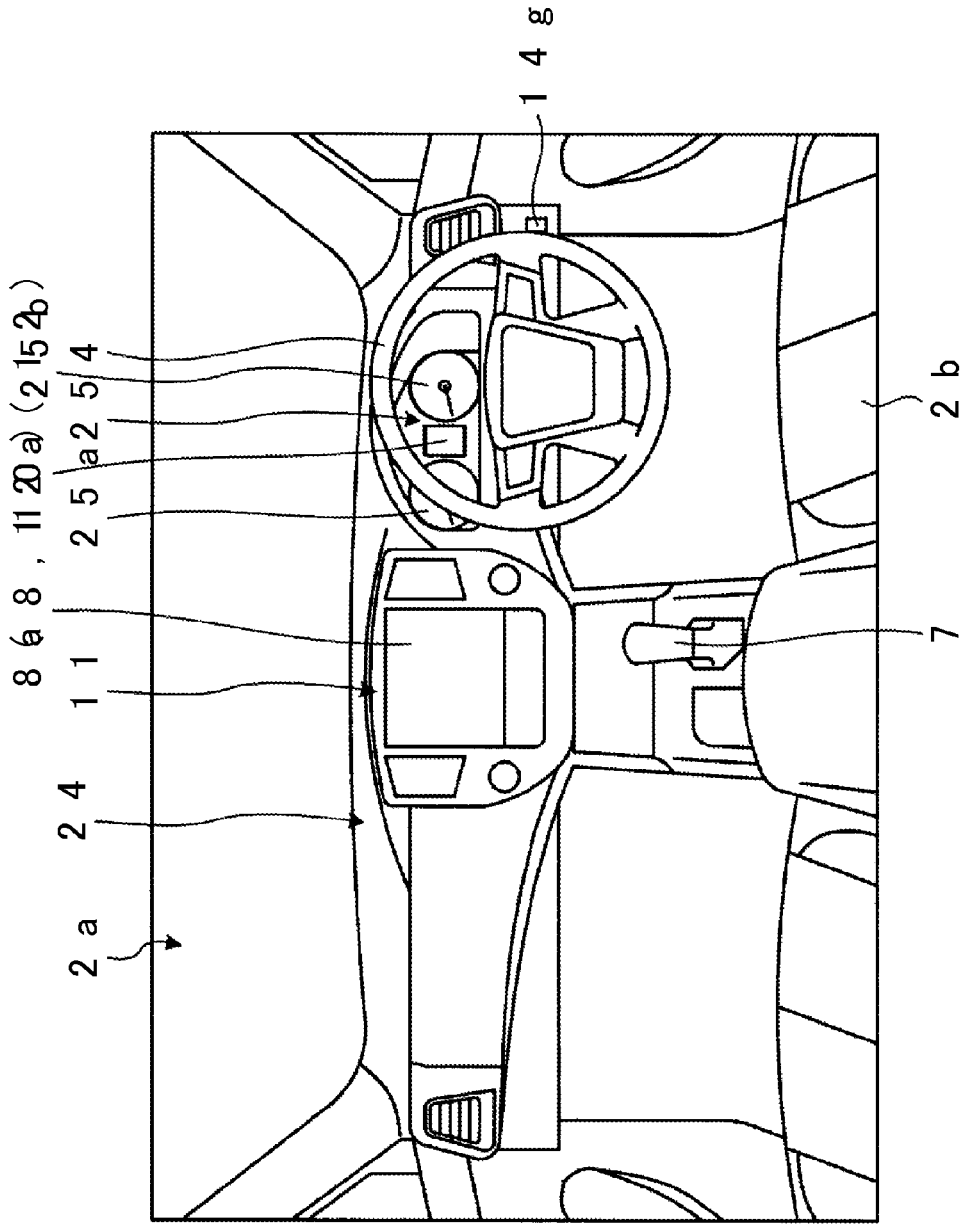
FIG. 3 is a view of an example of a dashboard of the vehicle according to the embodiment when viewed from the rear side of the vehicle.

A display device 12 different from the display device 8 is provided inside the cabin 2a. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a (FIG. 3) of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

Figure 2:
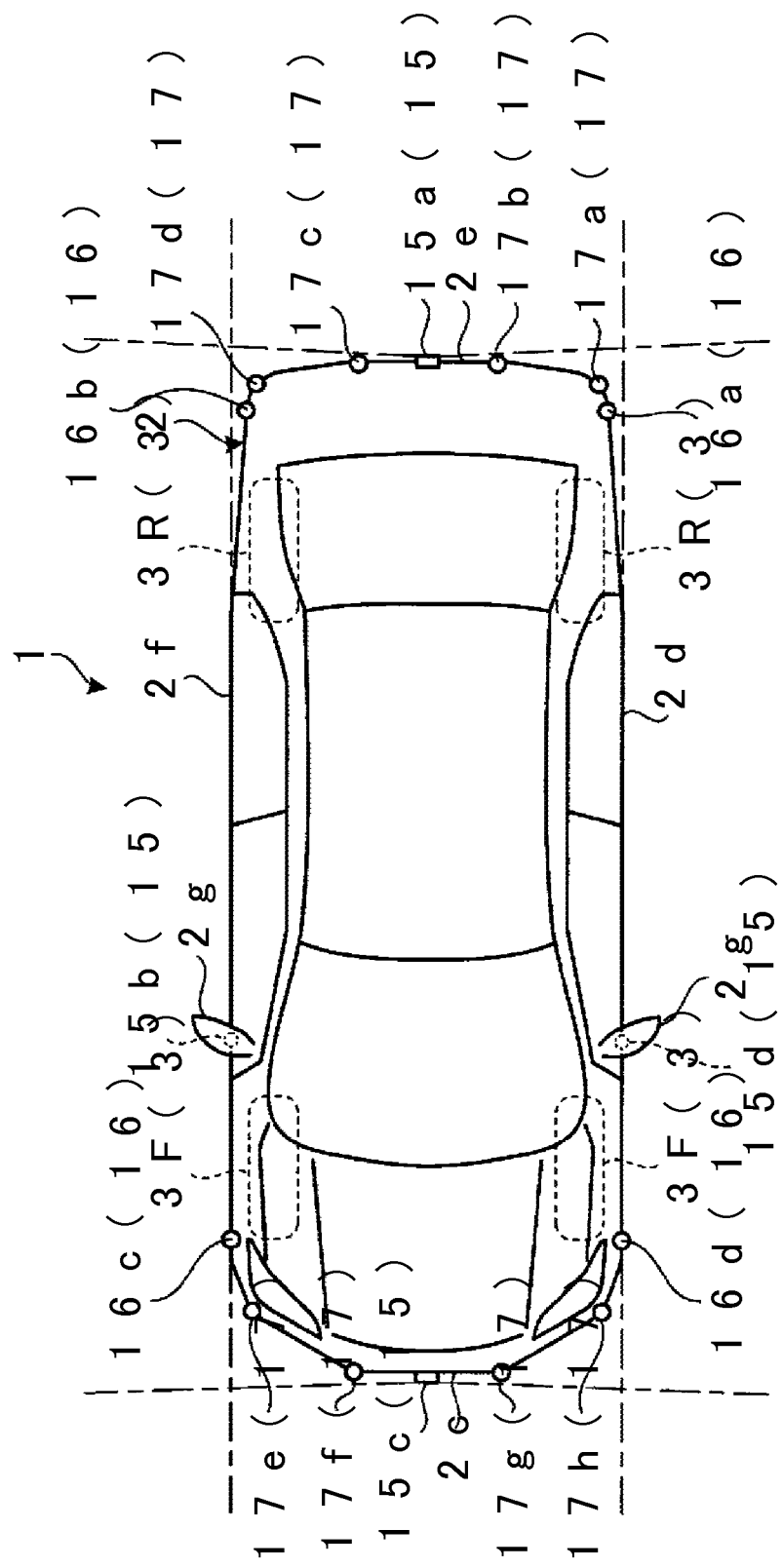
FIG. 2 is an exemplary plan view of the vehicle according to the embodiment.
Figure 4:
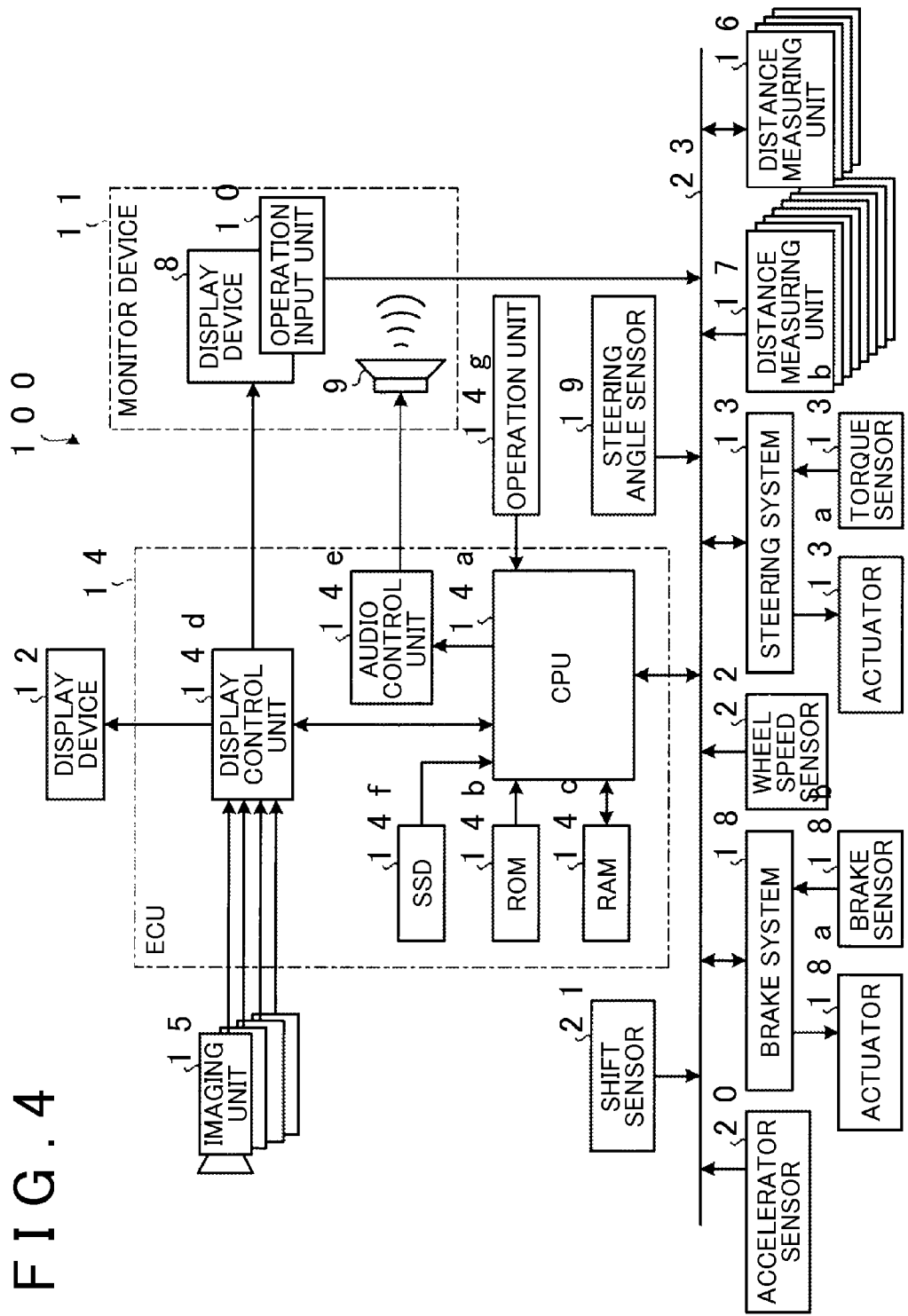
FIG. 4 is an exemplary block diagram of the configuration of a parking assist system according to the embodiment.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable. As illustrated in FIG. 4, the vehicle 1 includes a steering system 13 that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move and an outside environment around the vehicle body 2, including an area in which the vehicle 1 is allowed to be parked, and outputs the captured image as captured image data.

The imaging unit 15a is, for example, located at a rear end 2e of the vehicle body 2, and is provided at a lower wall portion of a door 2h of a rear boot. The imaging unit 15b is, for example, located at a right-side end 2f of the vehicle body 2, and is provided at a right-side door mirror 2g. The imaging unit 15c is, for example, located at the front of the vehicle body 2, that is, a front end 2c in the vehicle longitudinal direction, and is provided at a front bumper, or the like. The imaging unit 15d is, for example, located at the left side of the vehicle body 2, that is, a left-side end 2d in the vehicle width direction, and is provided at a door mirror 2g that serves as a left-side projecting portion. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and control, such as image processing related to images that are displayed on the display devices 8, 12, determination of a moving target position (a parking target position) of the vehicle 1, computation of a moving path (parking guidance path) of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and, by extension, the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is able to detect the position of the brake pedal that serves as the movable unit. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed, as a sensor value. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
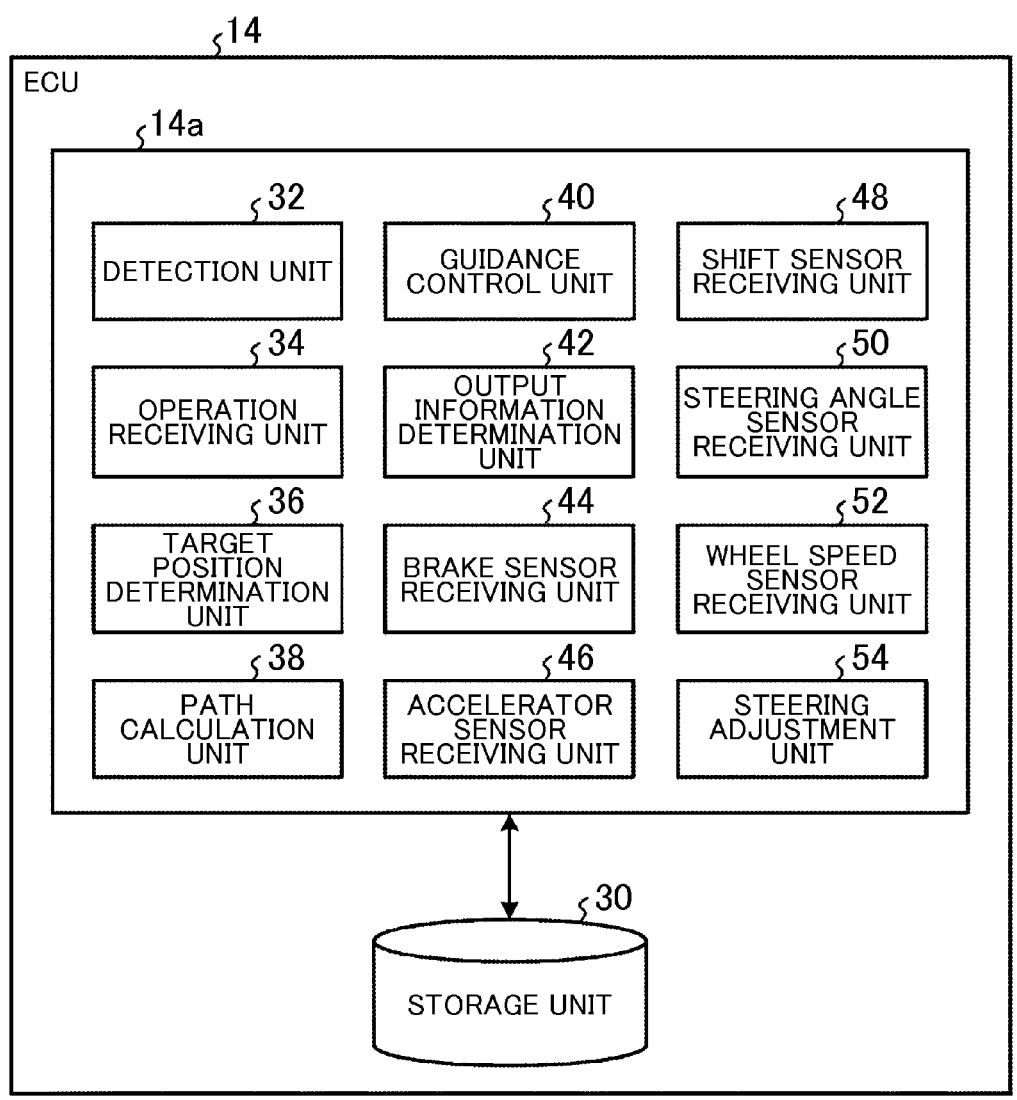
FIG. 5 is an exemplary block diagram of the configuration of an ECU of the parking assist system according to the embodiment.

As shown in FIG. 5, the ECU 14 includes the CPU 14a and a storage unit 30 that stores data that are used in computation in the CPU 14a or data calculated in computation in the CPU 14a. The CPU 14a includes various modules that are implemented by reading programs installed and stored in a storage device, such as the ROM 14b, and executing the programs. For example, the CPU 14a includes a detection unit 32, an operation receiving unit 34, a target position determination unit 36, a path calculation unit 38, a guidance control unit 40, an output information determination unit 42, a brake sensor receiving unit 44, an accelerator sensor receiving unit 46, a shift sensor receiving unit 48, a steering angle sensor receiving unit 50, a wheel speed sensor receiving unit 52, a steering adjustment unit 54, and the like.

The detection unit 32 detects an obstacle around the vehicle 1, a frame line or partition line on a road surface, or the like, on the basis of information that is provided from the imaging units 15 and the distance measuring units 16, 17. The detection unit 32 may function as a detection unit that detects an available parking area in an area around the vehicle 1 on the basis of the detected obstacle, frame line, partition line, or the like. The operation receiving unit 34 acquires a signal that is input through operation of the operation unit 14g. The operation unit 14g is, for example, a push button, a switch, or the like. A request for parking assist or a cancellation of parking assist is allowed to be performed with the use of the operation unit 14g. The target position determination unit 36 determines a moving target position, that is, parking target position, of the vehicle 1. The path calculation unit 38 calculates a moving path or parking guidance path for guiding the vehicle 1 from the current position of the vehicle 1 to the parking target position included in the available parking area. The guidance control unit 40 controls the portions of the vehicle 1 such that the vehicle 1 moves to the moving target position or parking target position along the moving path or parking guidance path. The output information determination unit 42 determines information that is output through the display device 12, the display device 8, the audio output device 9, or the like, an output mode of the information, and the like.

The brake sensor receiving unit 44 acquires a signal that is output from the brake sensor 18b, that is, a signal based on operation input of the brake operation unit 6, for example, the brake pedal. The brake sensor receiving unit 44 functions as an intention confirmation unit that acquires an intention confirmation signal indicating a driver's (user's) intention to decelerate, park or stop the vehicle. The brake sensor receiving unit 44 may acquire an operation input of a parking brake (not shown) or may function to acquire an intention confirmation signal indicating a driver's intention to park or stop the vehicle on the basis of the operation input. The accelerator sensor receiving unit 46 acquires a signal that is output from the accelerator sensor 20, that is, a signal based on operation input of the accelerator operation unit 5, for example, the accelerator pedal. The accelerator sensor receiving unit 46 functions as an intention confirmation unit that acquires an intention confirmation signal indicating a driver's intention to drive or accelerate. The shift sensor receiving unit 48 acquires a signal that is output from the shift sensor 21, that is, a signal based on operation input of the shift operation unit 7, for example, the shift lever. The shift sensor receiving unit 48 functions as an intention confirmation unit that acquires an intention confirmation signal indicating a driver's intention to drive the vehicle forward upon reception of a signal indicating D position and that acquires an intention confirmation signal indicating a driver's intention to drive the vehicle backward upon reception of a signal indicating R position. Similarly, the shift sensor receiving unit 48 functions as an intention confirmation unit that acquires an intention confirmation signal indicating a driver's intention to park or stop the vehicle upon reception of a signal indicating P position. The steering angle sensor receiving unit 50 acquires a signal that is output from the steering angle sensor 19, that is, a signal based on operation input of the steering unit 4, for example, the steering wheel. The steering angle sensor receiving unit 50 functions as an intention confirmation unit that acquires a steering state of the vehicle 1, which is automatically controlled by the guidance control unit 40, and that acquires an intention confirmation signal indicating a driver's intention to steer the steering wheel. The wheel speed sensor receiving unit 52 functions as an acquisition unit that acquires a signal that is output from the wheel speed sensor 22, that acquires information about determination as to whether the vehicle 1 is traveling or stopped on the basis of the vehicle speed, and that acquires information about determination as to whether a guidance state in the case of automatically guiding the vehicle to park the available parking area is appropriate. When steering control by the guidance control unit 40 has ended as a result of cancellation of parking assist, the steering adjustment unit 54 adjusts the steering angle such that the steering angle at the end of steering control is kept for a predetermined period or the steering angle is gradually reduced from the steering angle at that time toward the neutral position. An example in which the above-described modules are configured separately by functions is described. Instead, two or more functions may be configured in an integrated manner. For example, the brake sensor receiving unit 44, the accelerator sensor receiving unit 46, the shift sensor receiving unit 48, the steering angle sensor receiving unit 50 and the wheel speed sensor receiving unit 52 may be integrated as a sensor receiving unit. The guidance control unit 40 and the steering adjustment unit 54 may be integrated to serve as a control unit.

Figure 6:
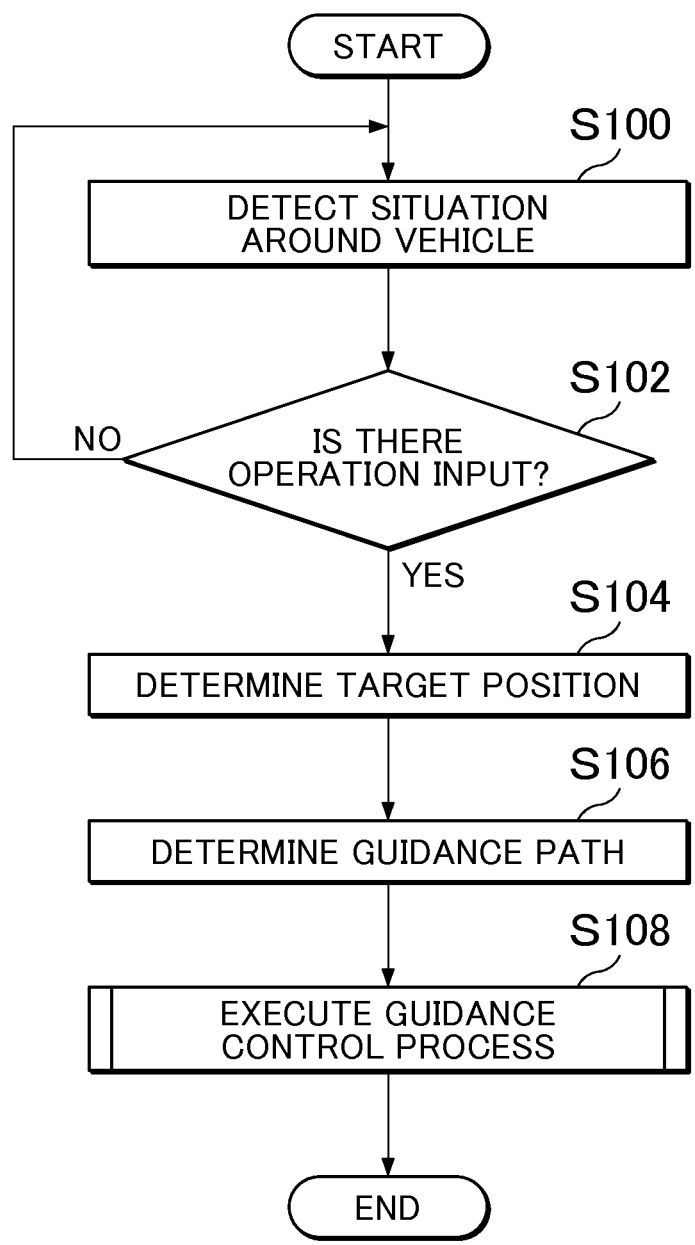
FIG. 6 is a flowchart that illustrates a parking assist process of the parking assist system according to the embodiment.

FIG. 6 is a flowchart that schematically illustrates a parking assist process of the parking assist system 100 according to the present embodiment. Initially, the detection unit 32 of the CPU 14a detects an obstacle around the vehicle 1, a frame line or partition line on a road surface, or the like, on the basis of information that is provided from the imaging units 15 and the distance measuring units 16, 17 (S100). The imaging units 15 and the distance measuring units 16, 17 may be configured to all constantly function or partially selectively function when the power switch of the vehicle 1 is turned on. For example, the imaging units 15 and the distance measuring units 16, 17 may be used separately among an ordinary drive mode, the parking assist mode, and the like. For example, a detection period, a detection area or a detection accuracy may be switched among the ordinary drive mode, the parking assist mode, and the like. The CPU 14a waits for reception of an operation input to request the start of parking assist via the operation receiving unit 34. When reception of the operation input is not found (No in S102), the process returns to S100, and constructs information by detecting a situation around the vehicle 1. On the other hand, when reception of the operation input is found in S102 (Yes in S102), that is, when a user shows an intention to park and desires to search for a parking place, the process of determining a target position is started by the target position determination unit 36 (S104). Although details will be described later, the target position determination unit 36 searches for a space in which the vehicle 1 is allowed to be parked, that is, an available parking area, in consideration of the size of the vehicle 1 on the basis of information that is input from the imaging units 15, the distance measuring units 16, 17, and the like, and determines a parking target position that is a target for guiding the vehicle 1 to that space. When the parking target position is determined, the path calculation unit 38 determines a parking guidance path for guiding the vehicle 1 from the current position of the vehicle 1 to the parking target position included in the available parking area (S106). Various known path calculation methods are usable to calculate the parking guidance path, and the detailed description is omitted. When the parking guidance path is determined, the guidance control unit 40 of the CPU 14a executes a guidance control process through automatic steering with the use of the steering system 13 and traveling by the use of creeping (S108). The details of the guidance control process will be described later. When the vehicle 1 is an electric automobile, a hybrid automobile, or the like, the vehicle 1 may be guided by causing the vehicle 1 to travel at a low speed through motor control. Prior to the start of the above-described guidance control, the output information determination unit 42 of the CPU 14a provides display related to an operation to require the user at the start of parking assist or during parking assist, such as switching between forward traveling and reverse traveling and adjustment of the speed through shift lever operation.

Figure 7:
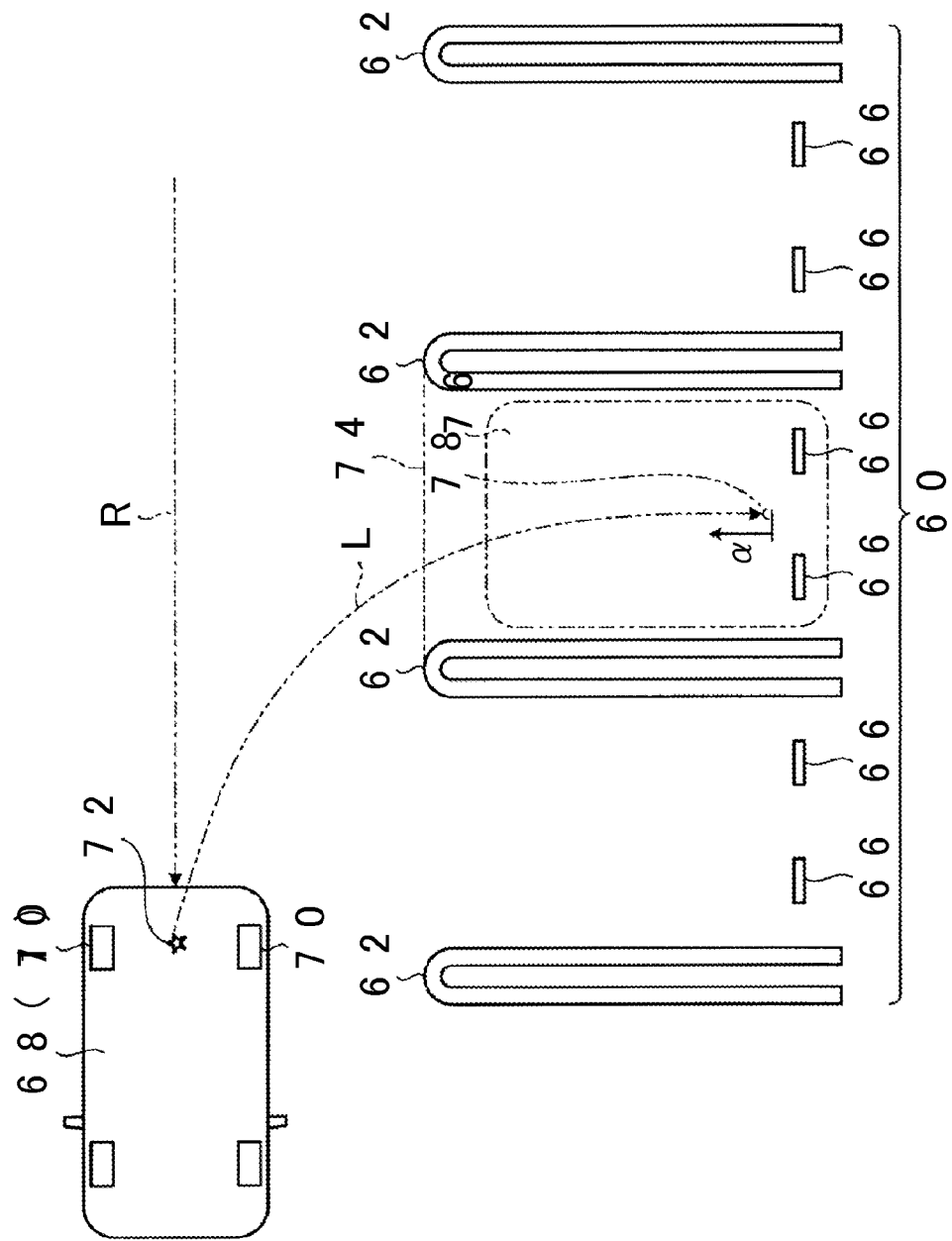
FIG. 7 is a view that illustrates a behavior of a vehicle in a parking place and a state of detection of an available parking area for the purpose of illustrating the parking assist process of the parking assist system according to the embodiment.

Prior to description of the guidance control process in S108 of FIG. 6, a behavior of the vehicle, on which the parking assist system 100 is mounted, in a parking place and a state of detection of an available parking area will be described with reference to FIG. 7. In the example shown in FIG. 7, the parking place 60 is partitioned by a plurality of partition lines 62 drawn on a flat road into available parking areas (parking spaces) one by one. FIG. 7 shows, for example, three parking spaces. Sprags 66 are arranged at the rear end sides of the partition lines 62 in each parking space. A host vehicle 68 is equivalent to the vehicle 1 described with reference to FIG. 1 to FIG. 3. The parking assist system 100 described with reference to FIG. 4 is mounted on the host vehicle 68. In the case of the present embodiment, the host vehicle 68 is, for example, guided to enter the available parking area detected to be available through reverse traveling among the parking spaces and park in the available parking area. The host vehicle 68, for example, has a guidance reference point 72 at substantially the center of an axle that couples right and left rear wheels 70. The position of the guidance reference point 72 is not limited to the position in the axle, and may be set to any position in the host vehicle 68. The host vehicle 68 is guided such that the guidance reference point 72 is brought into substantially coincidence with a parking target position that is set in the available parking area and that is determined in advance of the start of the guidance, thus assisting in parking the host vehicle 68 to the available parking area.

Specifically, when the host vehicle 68 enters the parking place 60, the host vehicle 68 detects with the use of the detection unit 32 whether there is a parking space or space that may be an available parking area in an area around the host vehicle 68 while traveling at a low speed. In this case, the detection unit 32 searches for an available parking area with the use of the imaging units 15 and the distance measuring units 16, 17 as described above. For example, while the host vehicle 68 travels in the parking place 60 at a low speed in the arrow R direction along the direction in which the partition lines 62 are arranged, the host vehicle 68 detects an object that is an obstacle at the time of guiding for parking the host vehicle 68, for example, the position and size of another vehicle, or the like, with the use of the distance measuring units 16, 17. In this case, detection work is performed by the vehicle left face-side distance measuring units 16a, 16d, and the like, in FIG. 2. The positions and interval of the partition lines 62, and the like, that are difficult to be detected by the distance measuring units 16, 17 and the depth, and the like, of each partition line 62 are detected by the use of mainly the vehicle left face-side imaging unit 15d in FIG. 2. The detection unit 32 is allowed to determine that there are vacant parking spaces, that is, there are candidates for available parking area, in the case where no obstacle is detected by the distance measuring units 16, 17. For example, in the case where other vehicles have been already parked in parking spaces, when it is determined that a spaced distance in the vehicle width direction between two other vehicles is longer than a value obtained by adding a predetermined allowance distance, which should be ensured at each side of a vehicle, to the vehicle width of the host vehicle 68, this space is detected as a candidate for available parking area. When no obstacle, such as another vehicle, is found by the distance measuring units 16, 17, and additionally when the partition lines 62 are captured by the imaging units 15 and a distance between the adjacent partition lines 62 is sufficient to park the host vehicle 68, the parking space is detected as a candidate for available parking area. A plurality of such candidates for available parking area may be detected, the user may be, for example, allowed to select one candidate from among the plurality of detected candidates or the parking assist system 100 may be configured to select an available parking area having the most favorable condition from among the detected candidates. Detection of an available parking area may be ended at time at which an available parking area has been detected for the first time, and the detected available parking area may be set for an available parking area to which the vehicle is guided.

When the available parking area is determined, the target position determination unit 36 determines a parking target position for guiding the host vehicle 68. In the case of the present embodiment, the target position determination unit 36 may set a reference line 74 that connects the distal ends of the partition lines 62 and may determine a parking frame 76 in consideration of the length of the host vehicle 68 in the longitudinal direction based on the reference line 74 and an offset distance in the backward direction from the distal ends of the partition lines 62 in the case where the host vehicle 68 is actually parked. A distance from the front end of the host vehicle 68 to the guidance reference point 72 is structurally uniquely determined in the host vehicle 68, so, when the parking frame 76 is determined, the corresponding parking target position 78 is determined. When other vehicles have been already parked on both sides of the determined available parking area, the target position determination unit 36 is allowed to set a reference line 74 by connecting traffic road-side distal ends of the right and left adjacent parked vehicles. In this case, a parking frame 76 is determined such that the traffic road-side distal end of the host vehicle 68 substantially coincides with the reference line 74. A distance from the front end of the host vehicle 68 to the guidance reference point 72 is structurally uniquely determined in the host vehicle 68, so, when the parking frame 76 is determined, the corresponding parking target position 78 is determined. In this way, when the parking frame 76 is set on the basis of the traffic road-side distal ends of adjacent parked vehicles, it is possible to align the traffic road-side distal ends between the host vehicle 68 and other vehicles, so it is possible to, for example, determine the parking target position in consideration of a park balance with the adjacent parked vehicles. For example, the host vehicle 68 is parked while coordinating the degree of traffic road-side protrusion of the host vehicle 68 with those of adjacent vehicles.

As shown in FIG. 7, better parking assist may be achieved as follows. The path calculation unit 38 calculates the parking guidance path L along which the host vehicle 68 is guided such that the guidance reference point 72 is brought into substantially coincidence with the parking target position 78 by a known technique, and the guidance control unit 40 executes automatic steering control while causing the host vehicle 68 to travel by the use of creeping. In the case of such parking assist, the user does not basically perform driving operation, and waits for completion of guidance as a result of the fact that the guidance reference point 72 of the host vehicle 68 reaches the parking target position 78.

Figure 8:
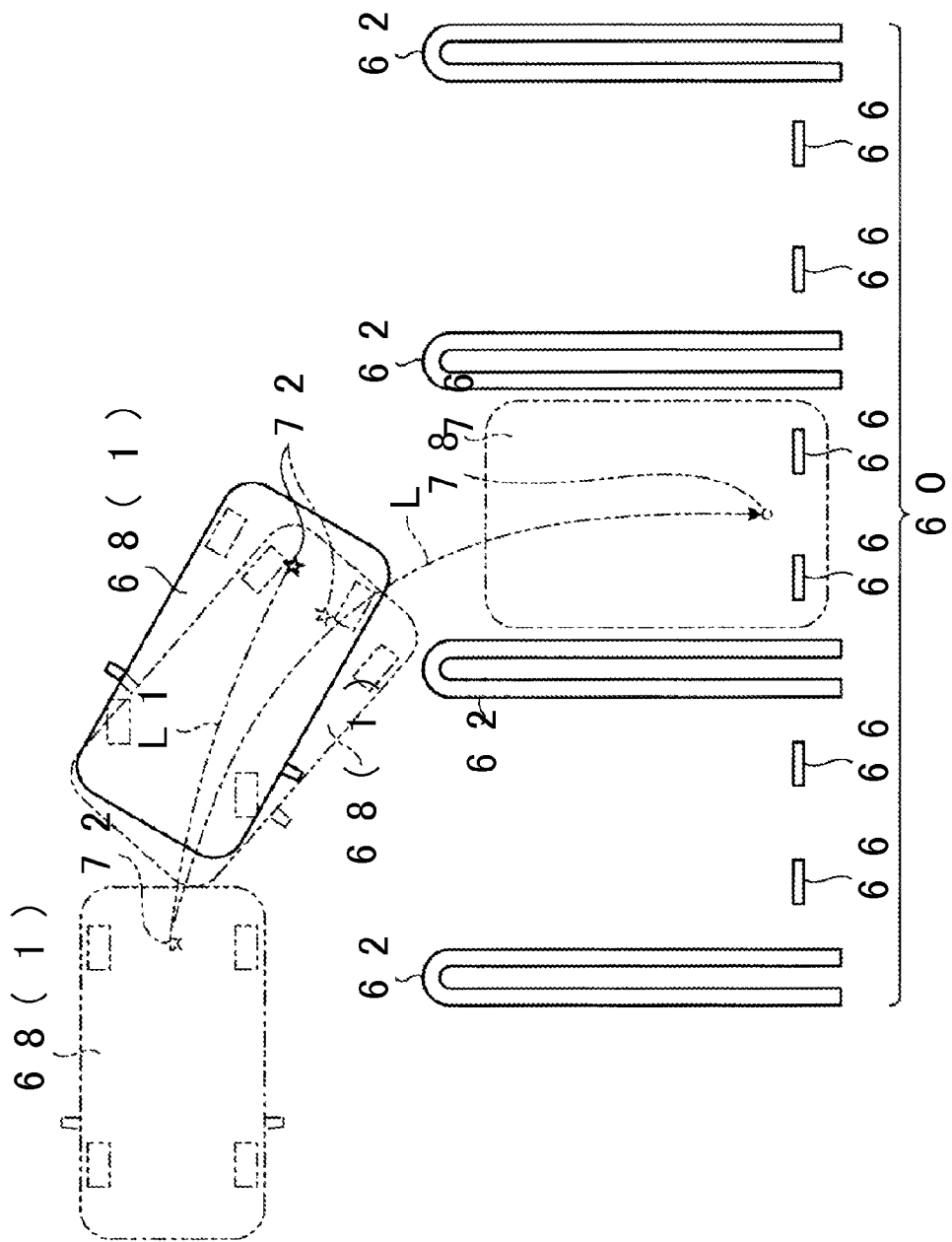
FIG. 8 is a view that illustrates the behavior of the vehicle in the case where parking assist of the parking assist system according to the embodiment is cancelled.

In this way, when the host vehicle 68 is guided along the calculated parking guidance path L, the host vehicle 68 is, for example, moved to travel by the use of creeping as described above. In this case, even when a driving force caused by creeping is constant, resistance depends on a state of a road surface, so the vehicle speed may vary. For example, when the road surface of the parking place 60 has a low resistance, a speed during guidance may exceed a speed suitable for guiding the host vehicle 68 along the parking guidance path L. In such a case, the host vehicle 68 may deviate from the parking guidance path L as indicated by a moving trajectory L1 shown in FIG. 8. In such a case, the guidance control unit 40 is configured to cancel parking assist control in order to prevent the position of the host vehicle 68 from significantly deviating from the parking target position 78. That is, the driving operation of the host vehicle 68 is left to the user. At this time, the guidance control unit 40 also cancels control over the steering system 13 that has been controlled till then, and sets a control amount (assist torque) to zero. As a result, the steering state returns to the neutral position. Thus, the moving trajectory L1 changes from a state where a turning radius is larger than that of the parking guidance path L to a straight state, and a deviation of the host vehicle 68 from the parking guidance path L further proceeds. As a result, the user may experience a feeling of strangeness that the host vehicle 68 distances from the parking space for which the host vehicle 68 has been initially intended to head, as a result of cancellation of parking assist.

In the parking assist system 100 according to the present embodiment, when parking assist is cancelled, the above-described feeling of strangeness is eliminated by adjusting the steering angle with the use of the steering adjustment unit 54.

Figure 9A:
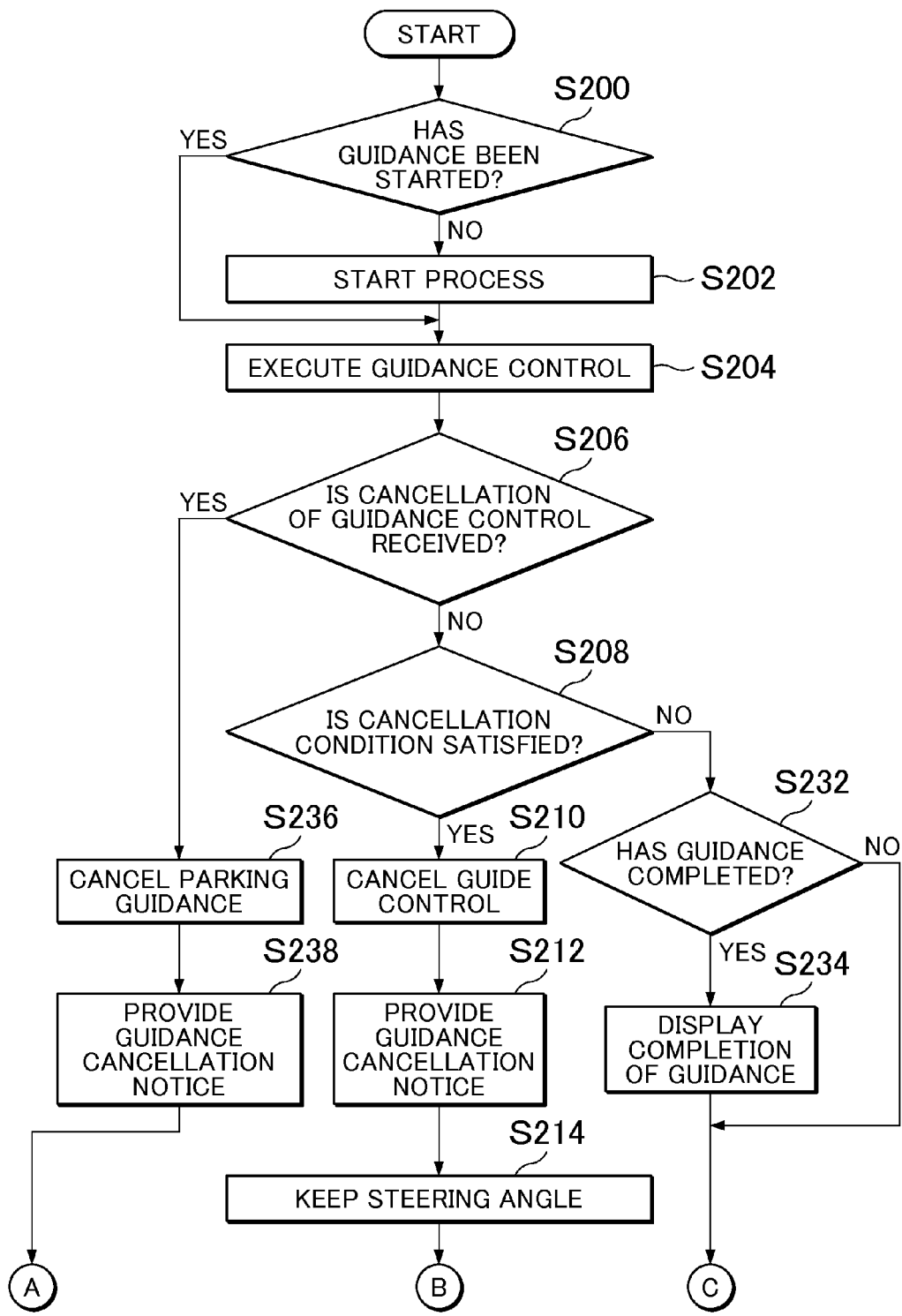
FIG. 9A is a flowchart that illustrates the details of a guidance control process shown in FIG. 6.
Figure 9B:
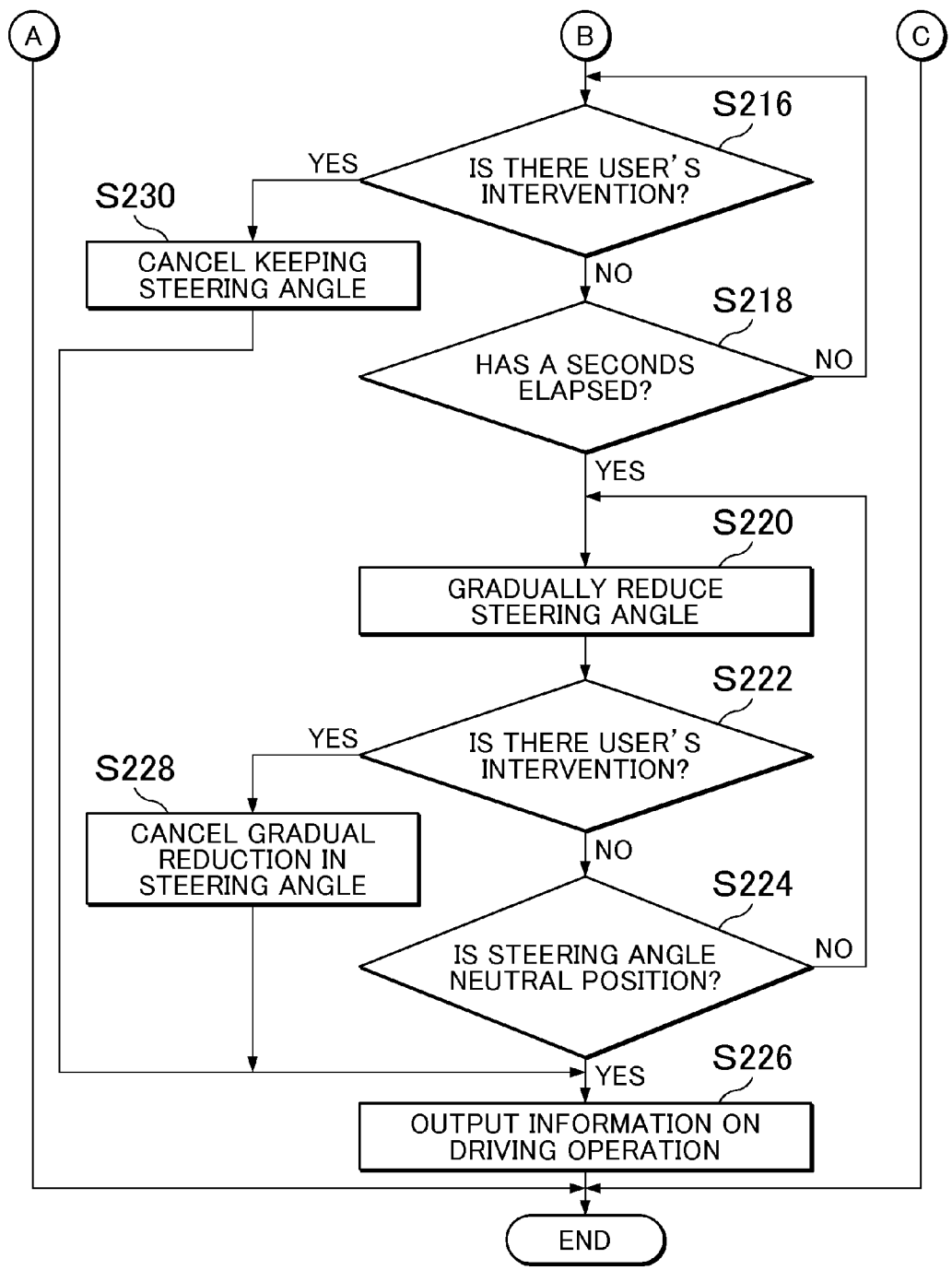
FIG. 9B is a flowchart that illustrates the details of a guidance control process shown in FIG. 6

FIG. 9A and FIG. 9B are a flowchart that shows the details of the guidance control process of S108 in the flowchart shown in FIG. 6. Initially, the guidance control unit 40 of the CPU 14a determines whether guidance control has been already started. When guidance control has not been started yet (No in S200), the guidance control unit 40, for example, provides a message, or the like, of the start of guidance through the audio output device 9, or the like, via the output information determination unit 42, the audio control unit 14e, and the like, as a start process (S202). The guidance control unit 40 performs automatic steering with the use of the steering system 13, and executes guidance control through traveling by the use of creeping (S204). When guidance control has been already started in S200 (Yes in S200), the process of S202 is skipped.

Figure 10:
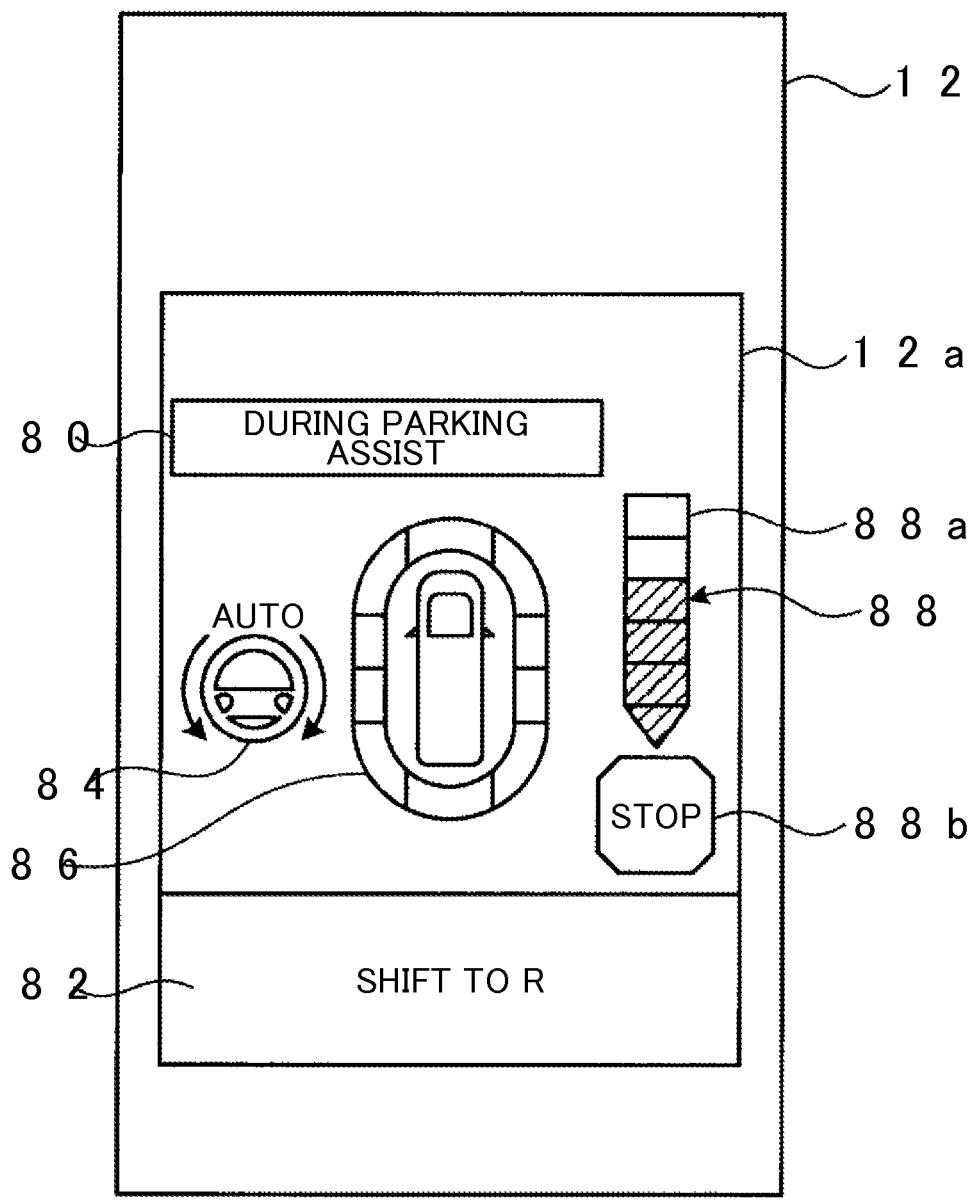
FIG. 10 is a view that shows an example of a screen of a display device that displays information about guidance and that shows an example of display during parking assist in the parking assist system according to the embodiment.

FIG. 10 shows an example of the screen 12a that is displayed on the display device 12 at the time when guidance control is started or while guidance control is being executed. The screen 12a includes a first display region 80 and a second display region 82 that display a control state during parking assist control and an operation command to the user. During parking assist control, for example, "DURING PARKING ASSIST" is displayed in the first display region 80. This display may be shown with blinking or highlighted color, such as red color, in order to call user's attention. For example, "SHIFT TO R" that indicates that guidance in reverse is started and that prompts the user to operate the shift lever is displayed in the second display region 82. In this case as well, in order to call user's attention, the message may be displayed with blinking or highlighted color. Other than the above, a steering symbol 84 that indicates that automatic steering control is being executed, a surrounding detection symbol 86 that indicates whether there is an obstacle that should be noted around the host vehicle 64, and a completion indicator 88 that indicates an approximate period up to completion of parking assist.

When steering control is being executed by the guidance control unit 40, the steering symbol 84 lights up to indicate that automatic steering is performed. The steering symbol 84 may be displayed at a rotation angle corresponding to an actual steering angle. The surrounding detection symbol 86 is configured such that individual symbols are arranged around a vehicle symbol. When there is an obstacle within a preset warning distance based on the detected result of the detection unit 32, the individual symbol indicating the direction in which there is an obstacle may be configured to light up. Each individual symbol may be displayed with, for example, "blue color" during steady time, and, when an obstacle to be warned has been detected, may change from "blue color" to "red color". The completion indicator 88 includes an indicator 88a and a target symbol 88b. The indicator 88a indicates a period up to completion of the guidance by an increase or reduction in the number of individual blocks each indicating a unit period. The target symbol 88b indicates completion of the guidance. The details of display on the screen 12a are illustrative, and, where necessary, a display item may be changed or a display mode may be changed.

Figure 11:
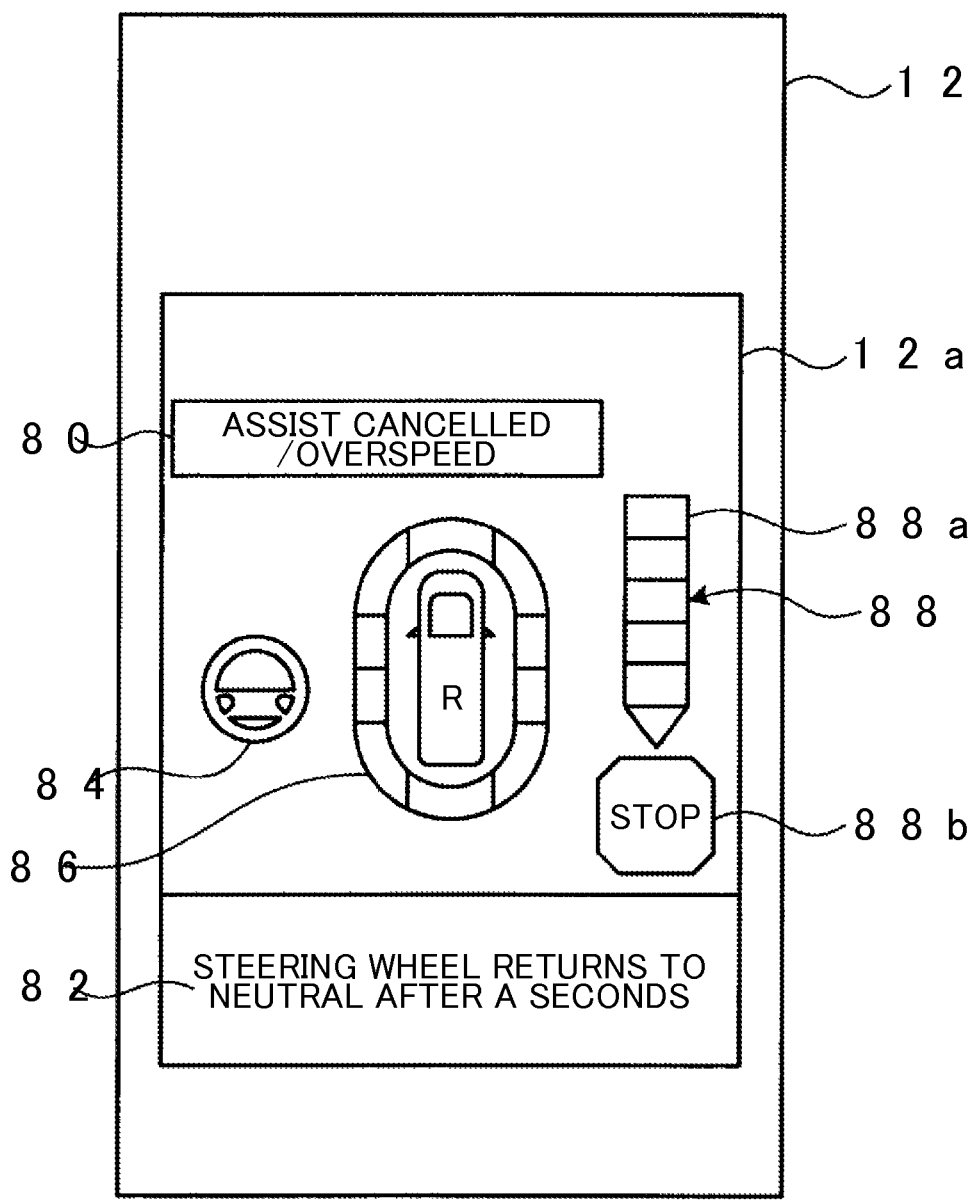
FIG. 11 is a view that shows an example of display of the screen of the display device in the case where parking assist is cancelled because of an overspeed in the parking assist system according to the embodiment.

Referring back to FIG. 9A, when guidance control is being executed, the guidance control unit 40 constantly monitors whether a cancellation operation for cancelling parking assist is input by the user (S206). For example, the guidance control unit 40 monitors whether an operation switch to request for parking assist is switched from an on state to an off state. As described above, during guidance control, the user does not operate the steering wheel or the brake pedal. Therefore, conversely, the guidance control unit 40 may monitor whether the steering wheel or the brake pedal is operated during guidance control, and may assume that such an operation is a cancellation operation. When no cancellation operation is received (No in S206), the guidance control unit 40 monitors whether a cancellation condition or end condition for cancelling parking assist is satisfied in the middle of guidance control (S208). For example, when a vehicle speed exceeds a predetermined vehicle speed suitable for parking assist, the guidance control unit 40 assumes that the cancellation condition is satisfied (Yes in S208), and cancels guidance control for parking assist (S210). The output information determination unit 42 outputs a signal to the display control unit 14d such that the screen 12a shown in FIG. 11 is displayed in response to the cancellation of guidance control. In this case, a message that indicates that assist is cancelled, the cause of the cancellation, and the like, such as "ASSIST CANCELLED/OVERSPEED", is displayed in the first display region 80, and a notice (notice message) that indicates a future behavior of the host vehicle 68, such as "STEERING WHEEL RETURNS TO NEUTRAL AFTER A SECONDS", is displayed in the second display region 82 (S212). In addition, the steering adjustment unit 54 keeps the steering angle at the time when assist is cancelled (S214). The steering angle may be kept with the use of the actuator 13a through control different from parking assist control or may be mechanically kept by a separately provided lock mechanism. In this way, by not permitting the steering angle to return to the neutral position just after cancellation of assist but keeping the steering angle for a predetermined period, a change in the behavior of the host vehicle 68 just after cancellation of parking assist is prevented, so it is possible not to cause the user to experience a feeling of strangeness. Keeping the steering angle is continued for, for example, A=5 seconds (No in S218). When there is no user's intervention within the period during which the steering adjustment unit 54 keeps the steering angle (No in S216), and the steering angle keeping period (A seconds) has elapsed (Yes in S218), the steering adjustment unit 54 gradually reduces the steering angle from the kept steering angle toward the neutral position (S220). User's intervention is, for example, an operation to start steering through steering wheel operation by the user, an operation to stop the host vehicle 68 at that spot through brake pedal operation, or the like. A gradual reduction in steering angle may be carried out by gradually reducing the torque of the steering system 13 or may be carried out by gradually reducing the locking torque of the lock mechanism. A gradual reduction to the neutral position may be smoothly carried out or may be stepwisely (intermittently) carried out. By smoothing carrying out a gradual reduction, it is also possible to smoothly change the behavior of the host vehicle 68. By stepwisely carrying out a gradual reduction, it is possible to make the user easily recognize that the steering angle has returned to neutral, so it is possible to call user's attention. The steering angle keeping period A or the rate of a gradual reduction may be constant or may be variable. When the steering angle keeping period A or the rate of a gradual reduction is variable, it may be changed by user's setting, and, for example, it may be changed in response to the steering angle at the time when parking assist is cancelled. For example, when the steering angle at the time when parking assist is cancelled is smaller than a predetermined value, for example, when the steering angle is close to the neutral position, the steering angle keeping period A or the rate of a gradual reduction may be, for example, reduced. On the other hand, when the steering angle at the time when parking assist is cancelled is larger the predetermined value, for example, when the steering angle is distant from the neutral position, the steering angle keeping period A or the rate of a gradual reduction may be, for example, increased. With this configuration, it is possible to adjust the steering angle in response to a situation of the host vehicle 68 at the time when parking assist is cancelled.

Figure 12:
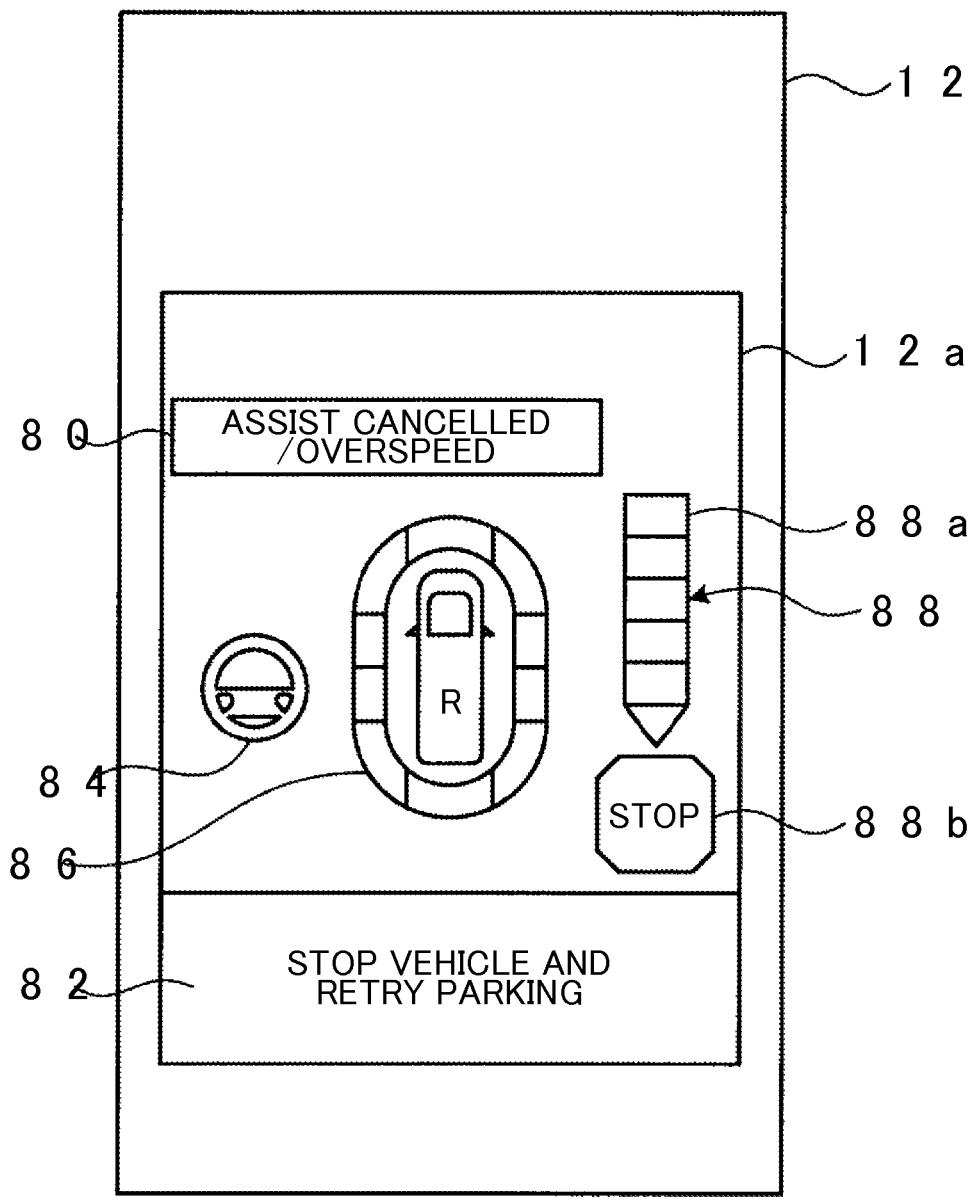
FIG. 12 is a view that shows another example of display of the screen of the display device in the case where parking assist is cancelled because of an overspeed in the parking assist system according to the embodiment.

When there is no user's intervention within a period during which the steering adjustment unit 54 gradually reduces the steering angle (No in S222), the output information determination unit 42 determines whether the steering angle has returned to the neutral position (S224). When it is determined that the steering angle has returned to the neutral position (Yes in S224), the output information determination unit 42 outputs a signal to the display control unit 14d such that the screen 12a shown in FIG. 12 is displayed, to inform the user of the following driving operation (S226). In this case, the message that indicates that assist is cancelled, the cause of the cancellation, and the like, such as "ASSIST CANCELLED/OVERSPEED", is displayed in the first display region 80. A message, such as "STOP AND RETRY PARKING", is displayed in the second display region 82. More specifically, the direction of steering, steering amount, or the like, for completing parking by user's operation may be displayed in the second display region 82. A message that prompts executing parking assist control again may be displayed.

In this way, by finally returning the steering angle to the neutral position after a lapse of a predetermined time from cancellation of parking assist, the vehicle travels straight ahead even if the vehicle is moving, so the behavior of the host vehicle 68 is easily understood by the user, and user's operation becomes easy because the following operation begins from a straight ahead state. Similarly, the host vehicle 68 stops in straight ahead position even when stopped, so an operation to be carried out subsequently is easily understood, so it is possible to reduce a burden on user's operation after cancellation of parking assist.

When it is determined in S222 that there is user's intervention within a period during which the steering adjustment unit 54 gradually reduces the steering angle (Yes in S222), for example, when the steering wheel is operated, the steering adjustment unit 54 cancels a gradual reduction in steering angle on the assumption that a user's operation of the host vehicle 68 is requested (S228). That is, a user's operation input is given priority, and the user is allowed to steer by freely operating the steering wheel. In S226, the output information determination unit 42 informs the user of the following driving operation by outputting a signal to the display control unit 14d such that the screen 12a shown in FIG. 12 is displayed (S226).

When there is user's intervention in S216 within a period during which the steering adjustment unit 54 keeps the steering angle (Yes in S216), for example, when the steering wheel is operated, the steering adjustment unit 54 cancels keeping the steering angle on the assumption that a user's operation of the host vehicle 68 is requested (S230). That is, a user's operation input is given priority, and the user is allowed to steer by freely operating the steering wheel. In S226, the output information determination unit 42 informs the user of the following driving operation by outputting a signal to the display control unit 14d such that the screen 12a shown in FIG. 12 is displayed (S226).

When the cancellation condition for cancelling parking assist is not satisfied in S208 (No in S208), the guidance control unit 40 monitors whether guidance for parking assist has completed. When the guidance has completed (Yes in S232), the guidance control unit 40 completes guidance control. The output information determination unit 42 causes the screen 12a of the display device 12 to display a message that the guidance for parking assist has completed (S234). In this case, for example, "PARKING ASSIST COMPLETE" is displayed in the first display region 80 of the screen 12a, and "APPLY PARKING BRAKE", or the like, may be displayed in the second display region 82. When the guidance has not completed in S232 (No in S232), the process of S234 is skipped, and the flow is once ended.

When parking assist is cancelled by the user in S206 (Yes in S206), for example, when an operation to turn off the operation switch to request for guidance assist, steering wheel operation, brake pedal operation, or the like, is carried out, the guidance control unit 40 cancels the guidance for parking on the assumption that the cancellation operation is carried out (S236). The output information determination unit 42 displays a guidance cancellation notice that indicates that the guidance is cancelled halfway with the use of the first display region 80 or second display region 82 of the screen 12a (S238). For example, "PARKING ASSIST CANCELLED. DRIVE CAREFULLY", or the like, is displayed, and the flow is once ended, and the process prepares for the next parking assist start request.

Figure 13:
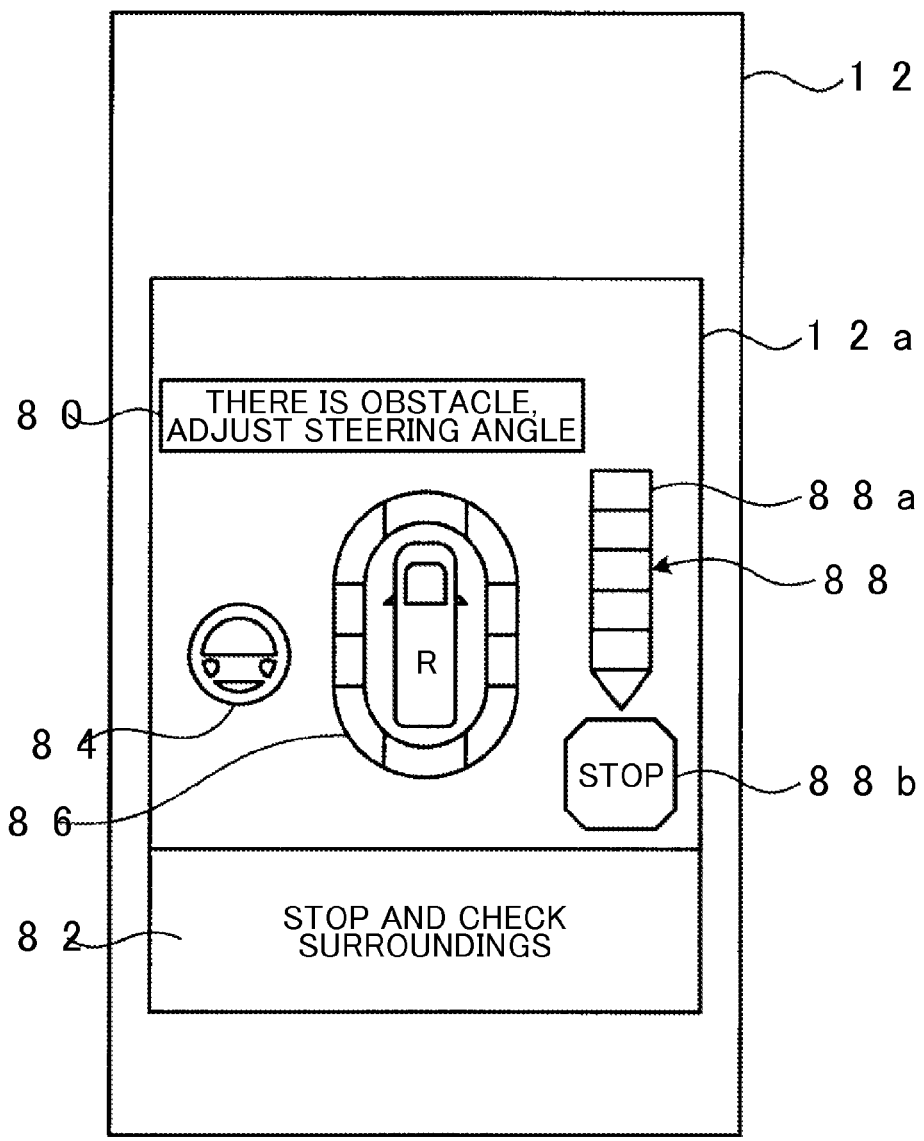
FIG. 13 is a view that shows another example of display of the screen of the display device in the case where parking assist is cancelled in the parking assist system according to the embodiment.

In the example of the above-described embodiment, when parking assist is cancelled, the steering angle at the time of the cancellation is initially kept, and, after a lapse of a predetermined period, the steering angle is gradually reduced so as to become the neutral position. In another embodiment, the steering adjustment unit 54 may select whether to keep or gradually reduce the steering angle in response to a situation around the host vehicle 68, obtained via the detection unit 32. For example, there may be a pedestrian, another vehicle, or the like, around the host vehicle 68. In such a case, the steering adjustment unit 54 may determine whether to avoid such an obstacle by turning the host vehicle 68 while keeping the steering angle or avoid such an obstacle by directing the host vehicle 68 in the straight ahead direction through a gradual reduction in steering angle. The output information determination unit 42 may cause the screen 12*a* of the display device 12 to display a message that there is an obstacle. In this case, for example, as shown in FIG. 13, "THERE IS OBSTACLE, ADJUST STEERING ANGLE" is displayed in the first display region 80 of the screen 12*a*, and "STOP AND CHECK SURROUNDINGS", or the like, may be displayed in the second display region 82.

In the example of the above-described embodiment, when parking assist is cancelled, the steering angle at that time is kept for a predetermined period or gradually reduced to the neutral position. In another embodiment, the steering angle at the time when parking assist is cancelled may be checked, and it may be determined whether adjustment control by the above-described steering adjustment unit 54 is executed. For example, when the steering angle is already the neutral position at the time when parking assist is cancelled or when steering control in guidance assist is in process of steering back to the neutral position, even when parking assist is cancelled, there is a low possibility that the behavior of the host vehicle 68 abruptly changes because of cancellation of parking assist. Therefore, in such a case, the above-described process of keeping the steering angle for a predetermined period or gradually reducing the steering angle to the neutral position may be skipped. By executing such a process, it is possible to simplify adjustment control at the time when parking assist is cancelled.

A parking assist program that is executed in the guidance control unit 40 or the output information determination unit 42 according to the present embodiment may be configured to be recorded in a computer-readable storage medium in an installable file or an executable file, and provided. The computer-readable storage medium includes a CD-ROM, a flexible disk (FD), a CD-R, a digital versatile disk (DVD), and the like.

The parking assist program that is executed in the guidance control unit 40 or the output information determination unit 42 according to the present embodiment may be configured to be stored in a computer connected to a network, such as the Internet, and provided through downloading via the network. The parking assist program that is executed in the guidance control unit 40 or the output information determination unit 42 according to the present embodiment may be configured to be provided or distributed via a network, such as the Internet.

In the present embodiment, the example in which a notice for parking assist is performed by the screen 12*a* that is displayed on the display device 12 is described. In another embodiment, information about similar details may be performed through voice by using the audio output device 9. It is possible to provide parking assist that is easily understandable by the user by providing both information through the screen 12*a* and information through voice.

The embodiment and alternative embodiments of the invention are described above; however, the embodiment and alternative embodiments are only illustrative and not intended to limit the scope of the invention. These novel embodiments may be implemented in other various forms, and may be variously omitted, replaced or changed without departing from the spirit of the invention. The scope and spirit of the invention encompass these embodiments and their modifications, and the invention described in the appended claims and equivalents thereof encompass these embodiments and their modifications.

A parking assist system according to the above-described embodiment of the invention may include a detection unit 32 that detects an available parking area in an area around a vehicle 1, a path calculation unit 38 that calculates a parking guidance path L for guiding the vehicle 1 from a current position of the vehicle 1 to a parking target position 78 included in the available parking area, and a guidance control unit 40 and a steering adjustment unit 54 that execute guidance control for guiding the vehicle 1 to the parking target position 78 by executing at least steering control along the parking guidance path L and, when an end condition for ending guidance is satisfied in the middle of execution of the guidance control, end the guidance control and carry out at least one of steering to keep a steering angle at an end of the steering control for a predetermined period or steering to gradually reduce the steering angle from the steering angle at the end of the steering control toward a neutral position. According to this embodiment, for example, even when the guidance control is ended, at least one of steering to keep the steering angle at the end of the steering control for the predetermined period or steering to gradually reduce the steering angle from the steering angle at the end of the steering control toward the neutral position is executed, so an abrupt change in the behavior of the vehicle 1 is suppressed. An abrupt change in the behavior of the vehicle 1 is suppressed after the end of the guidance control, so correction of the steering angle becomes easy, and, when the steering angle is returned to the state during guidance, a burden on that operation may be reduced.

The steering adjustment unit 54 of the parking assist system according to the above embodiment, for example, when an operation input of a steering unit 4 is received while the steering angle is kept or gradually reduced, may give priority to the operation input. According to this embodiment, for example, when a user desires to steer the vehicle even while the steering angle is kept or gradually reduced, steering is left to the user. As a result, it is possible to quickly achieve the steering angle required by the user.

The steering adjustment unit 54 of the parking assist system according to the above embodiment, for example, may select whether to keep or gradually reduce the steering angle in response to a situation around the vehicle 1. According to this embodiment, for example, when there is an obstacle, or the like, around the vehicle, it is possible to change into the steering angle at which the obstacle is more easily avoided.

The steering adjustment unit 54 of the parking assist system according to the above embodiment, for example, when the end condition is satisfied and the guidance control is ended, may output a notice that prompts a driving operation of the vehicle 1. According to this embodiment, for example, after parking assist is cancelled, it is possible to smoothly change into a user's driving operation.

The steering adjustment unit 54 of the parking assist system according to the above embodiment, when the end condition is satisfied in the middle of execution of the guidance control, may end the guidance control, execute steering to keep the steering angle at the end of the steering control for the predetermined period, and then carry out steering to gradually reduce the steering angle from the steering angle at the end of the steering control toward the neutral position.

What is claimed is:

1. A parking assist system comprising:
an electronic control unit configured to
detect an available parking area in an area around a vehicle by detecting an obstacle or a partition line, calculate a parking guidance path for guiding the vehicle from a current position of the vehicle to a parking target position included in the available parking area, execute guidance control for guiding the vehicle to the parking target position at a guidance speed for traveling by a use of creeping by executing at least steering control along the parking guidance path, and when the guidance speed exceeds a predetermined speed in a middle of execution of the guidance control, end the guidance control and carry out at least one of steering to keep a steering angle at an end of the steering control for a predetermined period or steering to gradually reduce the steering angle from the steering angle at the end of the steering control toward a neutral position.

2. The parking assist system according to claim 1, wherein the electronic control unit is configured to, when an operation input of a steering unit is received while the steering angle is kept or gradually reduced, give priority to the operation input.

3. The parking assist system according to claim 2, wherein the electronic control unit is configured to select whether to keep or gradually reduce the steering angle in response to a situation around the vehicle.

4. The parking assist system according to claim 3, wherein the electronic control unit is configured to, when the end condition is satisfied and the guidance control is ended, output a notice that prompts a driving operation of the vehicle.

5. The parking assist system according to claim 2, wherein the electronic control unit is configured to, when the end condition is satisfied and the guidance control is ended, output a notice that prompts a driving operation of the vehicle.

6. The parking assist system according to claim 1, wherein the electronic control unit is configured to select whether to keep or gradually reduce the steering angle in response to a situation around the vehicle.

7. The parking assist system according to claim 6, wherein the electronic control unit is configured to, when the end condition is satisfied and the guidance control is ended, output a notice that prompts a driving operation of the vehicle.

8. The parking assist system according to claim 1, wherein the electronic control unit is configured to, when the end condition is satisfied and the guidance control is ended, output a notice that prompts a driving operation of the vehicle.

9. The parking assist system according to claim 1, wherein the electronic control unit is configured to, when the end condition is satisfied in the middle of execution of the guidance control, end the guidance control, carry out steering to keep the steering angle at the end of the steering control for the predetermined period, and then carry out steering to gradually reduce the steering angle from the steering angle at the end of the steering control toward the neutral position.

10. The parking assist system according to claim 1, wherein the electronic control unit is configured to return the steering angle to the neutral position after ending of the guidance control.

11. The parking assist system according to claim 1, wherein when the steering angle is already the neutral position at the time when the guidance control is ended or when the steering control is in process of steering back to the neutral position at the time when the guidance control is ended, a process of keeping the steering angle at the time when the guidance control is ended for a predetermined period or a process of gradually reducing the steering angle to the neutral position is skipped.

* * * * *